US012106670B2

(12) United States Patent
Garg et al.

(10) Patent No.: US 12,106,670 B2
(45) Date of Patent: Oct. 1, 2024

(54) ACCIDENT REPORTER

(71) Applicant: T-Mobile USA, Inc., Bellevue, WA (US)

(72) Inventors: Parag Garg, Woodinville, WA (US); Mehdi Piraee, Bothell, WA (US); Joseph Baird, Kent, WA (US); Nicholas LaVassar, Issaquah, WA (US); Dhruv Chadha, Kirkland, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 18/217,894

(22) Filed: Jul. 3, 2023

(65) Prior Publication Data

US 2023/0351894 A1 Nov. 2, 2023

Related U.S. Application Data

(63) Continuation of application No. 17/164,724, filed on Feb. 1, 2021, now Pat. No. 11,735,050.

(51) Int. Cl.
*G08G 1/16* (2006.01)
*G07C 5/00* (2006.01)
(Continued)

(52) U.S. Cl.
CPC ............ *G08G 1/164* (2013.01); *G07C 5/008* (2013.01); *G07C 5/0808* (2013.01); *G08B 25/10* (2013.01)

(58) Field of Classification Search
CPC ........ G08G 1/164; G08G 1/205; G07C 5/008; G07C 5/0808; G08B 25/10; G08B 25/016
See application file for complete search history.

(56) References Cited

U.S. PATENT DOCUMENTS 7,129,826 B2 10/2006 Nitz et al.
7,348,895 B2 3/2008 Lagassey
(Continued)

FOREIGN PATENT DOCUMENTS

CN 110880027 A 3/2020
WO 2018230324 A1 12/2018
WO 2020141485 A1 7/2020

OTHER PUBLICATIONS

U.S. Appl. No. 17/164,724, Final Office Acton mailed Feb. 6, 2023, 13 pages.

(Continued)

*Primary Examiner* — Joseph J Dallo

(57) ABSTRACT

Methods, systems, and apparatus, including computer programs encoded on a computer storage medium, for implementing an accident reporter are disclosed. In one aspect, a method includes the actions of receiving data that reflects characteristics of a vehicle. The actions further include, based on the data, determining that the vehicle has been in an accident. The actions further include, based on determining that the vehicle has been in an accident and based on the data that reflects the characteristics of the vehicle, determining a classification of the accident. The actions further include determining additional data to collect and a recipient of a description of the accident. The actions further include receiving the additional data. The actions further include generating the description of the accident based on the data that reflects the characteristics of a vehicle and the additional data. The actions further include providing, for output, the description of the accident.

17 Claims, 5 Drawing Sheets

(51) Int. Cl.
*G07C 5/08* (2006.01)
*G08B 25/10* (2006.01)

(56) References Cited

U.S. PATENT DOCUMENTS

| | | | |
|---|---|---|---|
| 8,825,277 B2 | 9/2014 | McClellan et al. | |
| 8,903,636 B1 | 12/2014 | Kandari et al. | |
| 9,491,420 B2 | 11/2016 | Mimar | |
| 9,861,151 B2 | 1/2018 | Ciaramelletti et al. | |
| 10,137,889 B2 | 11/2018 | Pal et al. | |
| 10,317,240 B1 * | 6/2019 | Di Pietro | G01C 21/3694 |
| 10,564,638 B1 * | 2/2020 | Lockwood | G05D 1/0027 |
| 10,592,990 B1 | 3/2020 | Hanson | |
| 2013/0041521 A1 * | 2/2013 | Basir | B60R 25/33 701/1 |
| 2017/0240158 A1 | 8/2017 | Yamaguchi et al. | |
| 2017/0255966 A1 | 9/2017 | Khoury | |
| 2019/0088135 A1 | 3/2019 | Do et al. | |
| 2020/0302782 A1 | 9/2020 | Iwaki et al. | |
| 2021/0287530 A1 | 9/2021 | Reichardt et al. | |

OTHER PUBLICATIONS

U.S. Appl. No. 17/164,724, Notice of Allowance mailed Apr. 19, 2023, 17 pages.
U.S. Appl. No. 17/164,724, Office Acton mailed Aug. 16, 2022, 19 pages.

* cited by examiner

ACCIDENT REPORTER

CROSS-REFERENCE TO RELATED APPLICATION

This application is a continuation of U.S. application Ser. No. 17/164,724, filed Feb. 1, 2021, which is incorporated by reference.

BACKGROUND

A traffic collision occurs when a vehicle collides with another vehicle, pedestrian, animal, road debris, or other stationary obstruction, such as a tree, pole or building. Traffic collisions may result in injury, disability, death, and property damage as well as financial costs to the individuals involved and others. Traffic collisions may be caused by roadway, driver, and/or vehicle factors.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Automobile accidents come in many different forms. Some accidents are low-speed fender-benders, and others involve automobiles traveling at highway speeds. Some accidents involve only one automobile, and others involve two or more automobiles. Each of these accidents may require different types of data to understand what happened, to assist those involved in the accident, and to assist the first responders. This data may be collected from various sources that may be located in the automobile or in the vicinity of the accident. Some sources may include a wireless module that connects into the on-board diagnostic port, a mobile phone that was in the automobile at the time of the accident, and a camera with a field of view that included the accident. To get the most benefit out of this data, it would be helpful to understand the type and severity of the accident.

A cellular module that connects to the on-board diagnostic port may be configured to collect motion data of the automobile in addition to status data of the automobile. The cellular module may be configured to provide the motion data and the status data to a server for analysis. The server may analyze the motion data and the status data and determine that the automobile was involved in an accident and classify the type of accident. Based on the classification of the accident, the server automatically determines the appropriate data to collect, how to format that data, and where to provide the formatted data. For example, in the case of a low-speed accident in a parking lot, the server may classify the accident as a two-car accident at less than ten miles per hour on private property. Based on this classification, the server may automatically determine to generate a report that indicates the location of the accident, the speed and direction of the vehicle, and the location of the damage. The server may determine whether there are any surveillance cameras in the vicinity of the accident and attempt to collect camera data from them. The server may suggest actions for the driver such as taking pictures of the vehicles and requesting insurance information from the other driver. These decisions and actions by the server may be different in an accident classified as a high-speed accident. For a high-speed accident, the server may collect data focused on ensuring the safety and wellbeing of the driver and that first responders have access to the proper data.

Figure 1:
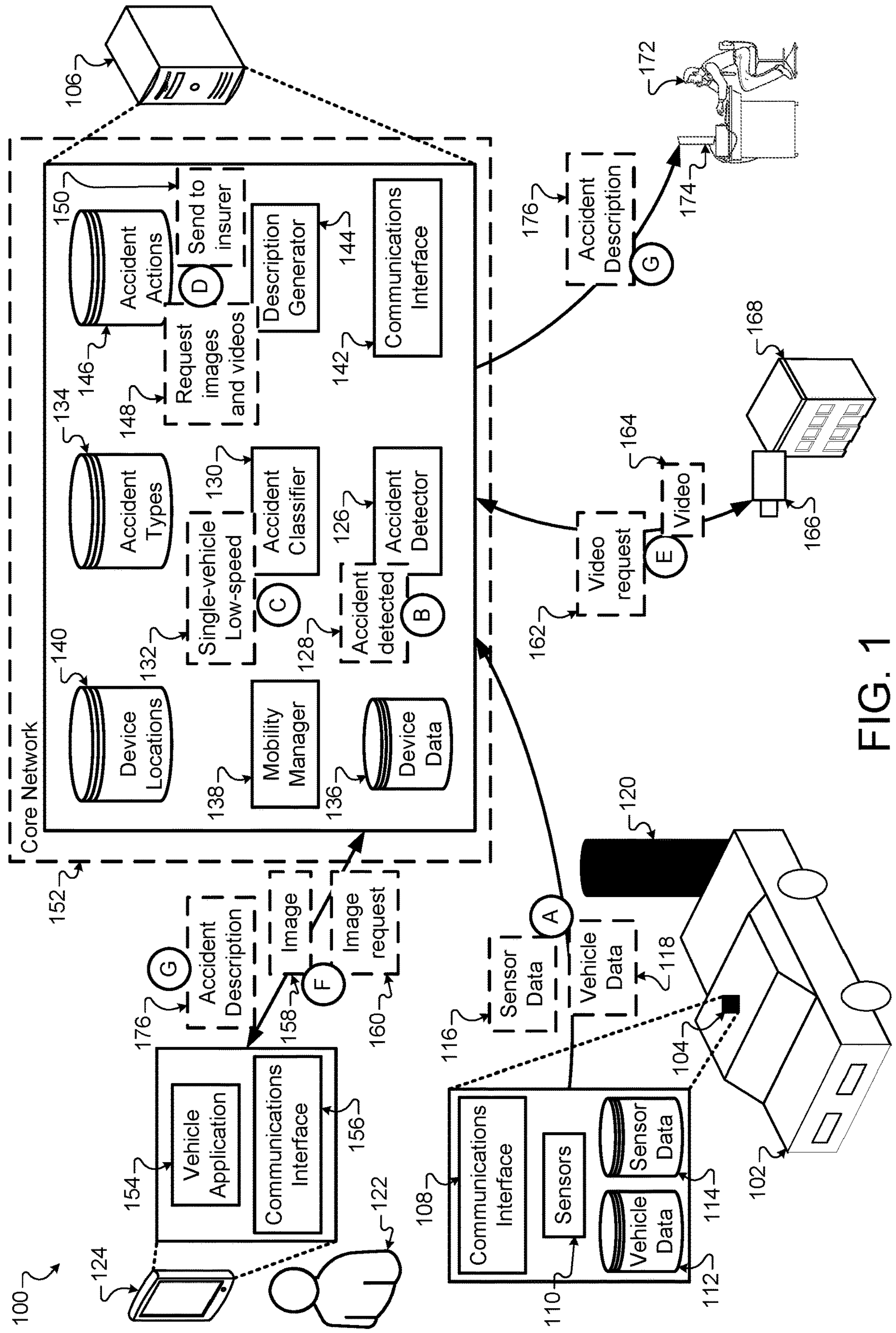
FIG. 1 illustrates an example system that is configured to detect, classify, and report an accident.

FIG. 1 illustrates an example system 100 that is configured to detect, classify, and report an accident. Briefly, and as described in more detail below, the system 100 includes a server 106 that is configured to communicate with a computing device 104 that is communicating with the vehicle 102. Based on the data received from the computing device 104, the server 106 may determine that the vehicle 102 has been in an accident. Based on the classification of the accident, the server 106 may perform different actions that may include ensuring that data related to the accident is collected and ensuring the safety and wellbeing of any passengers in the vehicle. FIG. 1 includes various stages A through G that may illustrate the movement of data between the server 106 and other computing devices. The system 100 may perform these stages in any order.

The vehicle 102 may include a computing device 104 that receives vehicle data 112 through the on-board diagnostic port of the vehicle 102. For example, the computing device 104 may plug into the on-board diagnostic port. In some implementations, the computing device 104 may be integrated into the vehicle. The computing device 104 may include various sensors 110 that are configured to detect the movement of the computing device 104, the location of the computing device 104, and/or the environment around the computing device 104. For example, the sensors 110 may include an accelerometer, a gyroscope, a GPS receiver, a barometer, an ambient light sensor, a camera, a compass, a gravity sensor, a proximity sensor, a magnetometer, a microphone and/or any other similar sensors.

The computing device 104 may store the data collected from the sensors 110 in the sensor data 114. The computing device 104 may store data from the sensors 110 in the sensor data 114 at periodic intervals, such as every ten seconds. The computing device 104 may store data from the sensors 110 while the vehicle is on, in motion, or moving at least at a threshold speed. The computing device 104 may receive vehicle diagnostic data from the on-board diagnostic port. The computing device 104 may store the vehicle diagnostic data in the vehicle data 112. The vehicle diagnostic data may include real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The computing device 104 may receive or request the vehicle diagnostic data at periodic intervals, such as every ten seconds. The computing device 104 may receive or request the vehicle diagnostic data while the vehicle is on, in motion, or moving at least at a threshold speed. In some implementations, the computing device 104 may receive or request the vehicle diagnostic data at the same time that the computing device 104 generates and stores data from the sensors 110. The computing device 104 may be configured to store the most recent data in the vehicle data 112 and the sensor data 114. For example, the computing device 104 may store the most recent hour of data in the vehicle data 112 and the sensor data 114.

The computing device 104 may include a communications interface 108. The communications interface 108 may include communication components that enable the computing device 104 to transmit data and receive data from other devices. For example, the communications interface 108 may be able to receive and exchange data with the server 106. The communication interface 108 may include an interface that is configured to communicate with base stations of a wireless carrier network. In some implementations, the communication interface 108 may be configured to communicate over a wide area network, a local area network, the internet, a wired connection, a wireless connection, and/or any other type of network or connection. The wireless connections may include Wi-Fi, short-range radio, infrared, and/or any other wireless connection.

The communications interface 108 may continuously transmit the vehicle data 112 and the sensor data 114 to the server 106, such as every ten seconds. In some implementations, the communications interface 108 may transmit the vehicle data 112 and the sensor data 114 to the server 106 in response to a request from the server 106. In some implementations, the communications interface 108 may transmit the vehicle data 112 and the sensor data 114 to the server 106 based on detecting a change in the vehicle 102. For example, the communications interface 108 may transmit the vehicle data 112 and the sensor data 114 to the server 106 based on the acceleration of the vehicle being greater than a threshold, such as more than fifteen miles per hour per second which may occur if the speed of the vehicle decreases at a rate of fifteen miles per hour in less than a second. As another example, the communications interface 108 may transmit the vehicle data 112 and the sensor data 114 to the server 106 in response to a request from the server 106.

In stage A, the user 122 is driving the vehicle 102 and is involved in an accident. The vehicle 102 collides with the pole 120 while traveling at five miles per hour. The acceleration of the vehicle 102 may be twenty miles per hour per second. Before the accident, the vehicle data 112 and the sensor data 114 may have stored the previous hour of data. The computing device 104 may compare the acceleration of the vehicle 102 to a threshold. If the acceleration of the vehicle 102 satisfies the threshold, then the communications interface may transmit the vehicle data 118 and the sensor data 116 to the server 106. In some implementations, the computing device 104 may store the vehicle data 112 and the sensor data 114 for an additional time period, such as five minutes, after determining that the acceleration of the vehicle 102 satisfied the threshold.

The server 106 may receive the sensor data 116 and the device data 118 from the computing device 104. The server 106 may be included in or in communication with a network such as a wireless carrier network that provides voice and data communication services to multiple devices, such as the computing devices 104, 124, and 174, camera 166, and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104, 124, and 174, camera 166, and other devices using a Wi-Fi network, short range radio, infrared communication, and/or any other similar communication technique.

The wireless carrier network may include a radio access network and a core network 152. The radio access network may include multiple base stations. The multiple base stations are responsible for handling voice and/or data traffic between multiple devices, such as the computing devices 104, 124, and 174, camera 166, and other devices and the core network 152. Accordingly, each of the base stations may provide a corresponding network cell that delivers telecommunication and data communication coverage. The core network 152 may use the network cells to provide communication services to the multiple subscriber devices. For example, the core network 152 may connect the multiple devices to other telecommunication and data communication networks, such as the Internet and the public switched telephone network (PSTN). The base stations are responsible for handling voice and data traffic between devices and the core network 152. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The server 106 includes an accident detector 126. The accident detector 126 may be configured to analyze sensor data 116 and vehicle data 118 received from devices such as the computing device 104 and determine when the corresponding vehicle has been in an accident. The server 106 may store the sensor data 116 and the vehicle data 118 in the device data 136. The accident detector 126 may use accident detection rules and/or accident detection models to determine whether the vehicle has been involved in an accident. The accident detection rules may specify how to compare the sensor data 116 and the vehicle data 118 to determine whether the vehicle 102 was involved in an accident. For example, an accident detection rule may indicate that the vehicle 102 has likely been involved in an accident if the airbag has deployed, where data indicating such may be received through the on-board diagnostic port. The accident detection models may be configured to receive the sensor data 116 and the vehicle data 118 and output data indicating whether the vehicle 102 has likely been in an accident. The accident detection models may be trained using machine learning and historical data that includes sensor data and vehicle data collected from vehicles before, during, and after accidents. In some implementations, the accident detection models may output an accident confidence score that indicates a likelihood that the vehicle 102 was involved in an accident.

In stage B, the accident detector 126 analyzes the sensor data 116 and the vehicle data 118 using the accident detection rules and/or accident detection models. The accident detector 126 may provide the sensor data 116 and the vehicle data 118 as an input to the accident detection models and/or compare the sensor data 116 and the vehicle data 118 as specified by the accident detection rules. The accident detector 126 may generate an accident determination 128 that indicates that the vehicle 102 was involved in an accident.

The server 106 may include a mobility manager 138. The mobility manager 138 may be configured to monitor the location of a computing device that is connected to the server 106 through a wireless base station. The location of the computing device may include the location of the wireless base station to which the computing device is connected and/or GPS data received from the computing device. The mobility manager 138 may store the location data in the device locations 140 of the server 106.

In some implementations, the mobility manager 138 may determine the location of a computing device at periodic intervals, such as every five seconds. In some implementations, the mobility manager 138 may determine the location of a computing device when the computing device connects to a different wireless base station and/or provides updated GPS data. In some implementations, the mobility manager 138 may determine the location of the computing device relative to the base station with which the computing device is communicating. In this case, the mobility manager 138 may determine the relative location based on data collected from the base station such as signal strength and direction of communications between the computing device and the base station. The mobility manager 138 may also determine the relative location based on the location of the base station and GPS data received from the computing device. The relative location data may include a distance between the computing device and the base station, the cardinal direction from the base station to the subscriber device, and/or any other similar measurements.

In some implementations, the accident detector 126 may use the location of the computing device 104 as determined by the mobility manager 138 to determine whether the vehicle 102 was likely involved in an accident. The accident detector 126 may use the location determined by the mobility manager 138 in addition to, or instead of, any location data included in the sensor data 116 and/or vehicle data 118.

The server 106 may include an accident classifier 130. The accident classifier 130 may be configured to classify the accident. The accident classifier 130 may select an accident classification from the accident types 134. The accident types 134 may identify various types of accidents. For example, the accident types 134 may include a low-speed single-vehicle accident, a low-speed multi-vehicle accident, a high-speed single-vehicle accident, a high-speed multi-vehicle accident, and/or any other similar accident types. The accident types 134 may include definitions for each of the type of accident. For example, the definition for the low-speed single-vehicle accident may be that one vehicle strikes an object other than another vehicle at a speed of less than twenty miles per hour. The definite for the high-speed multi-vehicle accident may be that one vehicle strikes another vehicle at a speed of greater than twenty miles per hour. In some implementations, the accident types 134 may include definitions for accidents based on additional factors, such as whether the airbag deployed.

In some implementations, the accident classifier 130 may use one or more classification models, in addition to or instead of, the accident type definitions to classify the accident. The classification models may be included in the accident types 134 and configured to receive the sensor data 116 and the vehicle data 118 and output data indicating the classification of the accident. The classification models may be trained using machine learning and historical data that includes sensor data and vehicle data for vehicles involved in various types of accidents and classifications for each of those accidents.

In stage C, the accident classifier 130 receives the accident determination 128 indicating that the accident detector 126 determines that the vehicle 102 was likely involved in an accident. The accident classifier 130 may also receive the sensor data 116 and the vehicle data 118. In response to the accident determination 128 indicating that the vehicle 102 was likely involved in an accident, the accident classifier 130 compares the sensor data 116 and the vehicle data 118 to the accident type definitions in the accident types 134 and/or provides the sensor data 116 and the vehicle data 118 as an input to the accident classification models. The accident classifier 130 may determine the accident classification 132 for the accident indicating that the vehicle 102 was involved in a single-vehicle low-speed accident.

The server 106 may include a description generator 144. The description generator 144 may be configured to generate a description 176 of the accident, determine recipients for the accident description 176, and/or determine whether to request any additional data that may be related to the accident. The description generator 144 may access the accident actions 146 that specify various actions for different types of accident. For example, in the case of a low-speed single or multi vehicle accident, the accident actions 146 may specify to request that the user 122 take pictures of the accident. As another example, in the case of a high-speed single or multi vehicle accident, the accident actions 146 may specify actions to ensure that the user 122 is safe. These actions may include requesting that the user 122 respond to a request sent to the computing device 124. Some additional actions may be to identify and alert local first responders and provide the first responders with the accident description 176.

In some implementations, an action included in the accident actions 146 may specify that the description generator 144 identify additional computing devices in a vicinity of the accident. The description generator 144 may request, from the mobility manager 138, data identifying computing devices that are within a threshold distance from the location of the accident. The accident actions 146 may specify a threshold distance based on the type of accident. For example, if the accident is a high-speed multi-vehicle accident, then the threshold distance may be one hundred meters from the location of the accident and/or the vehicle 102. If the accident is a low-speed single-vehicle accident, then the threshold distance may be thirty meters from the location of the accident and/or the vehicle 102.

The description generator 144 may receive data identifying the computing devices that are within a threshold distance of the accident. The description generator 144 may determine the type of these computing devices. Based on the type of the computing devices that are within a threshold distance of the accident, the description generator may request additional data from these devices. For example, if the nearby computing device is a camera, then the description generator 144 may request image and/or video data that was captured during, before, and/or after the accident. If the nearby computing device is a mobile phone, then the description generator 144 may transmit a request for image, video, and/or audio data of the vicinity of the accident. This may include a request to a user of the mobile phone to capture the image, video, and/or audio data. The description generator 144 may also request that the user of the mobile phone provide any information related to the accident, such as a description of any events related to the accident.

The server 106 may generate the accident actions 146 based on analyzing previous requests for information related to accidents. For each of the previous accidents, software executed by one or more processors of the server 106 may analyze data that includes the location of the accident, any injuries to any drivers, passengers, and/or other people, the speed of the vehicle, the data requested by other parties, the identity of the other parties, and/or any other similar information. The server 106 may determine the types of data that each party requests for each type of accident. For example, a first responder may request identifying information for the drivers of the vehicles in the case of a low-speed accident. After a high-speed accident, a first responder may request information for any passengers and/or witnesses of the accident in addition to any injuries of the drivers, passengers, and/or other people. An insurer may request insurance information for all parties involved in the accident.

Based on analyzing the previous requests for information related to accidents, the server 106 may generate the accident actions 146 that specify the data to request and the recipients for information related to the accident. The accident actions 146 may specify how to format the data before providing the data to each recipient. A first responder may receive the data in a different format than an insurer. The accident actions 146 may specify what accident related data to combine and how to combine and format the accident related data for each recipient.

In some implementations, a recipient may receive the accident description 176 from the server 106 and request additional data that may not be included in the accident description 176. In this case, the description generator 144 may receive the request and, if available, provide the additional information. The description generator 144 may also update the accident actions 146 to ensure that the request data may be collected in the future when a similar accident occurs. In some instances, the description generator 144 may receive data related to the accident after outputting the accident description 176. In this case, the description generator 144 may provide the new data to the recipients of the accident description 176 if the new data would have been included in the accident description 176.

In the example of FIG. 1 and in stage D, the description generator 144 accesses the accident actions 146. Based on the accident classification 132, the sensor data 116, and the vehicle data 118, the accident actions 146 specify a data collection request 148 to collect additional images and videos of the accident. The accident actions 146 also specify an accident description transmission request 150 to transmit the accident description 176 to the user 122 and the insurer 172. The accident actions may specify a different format for the accident description 176 that the insurer 172 receives and the accident description 176 that the user 122 receives. For example, the accident description 176 that the user 122 receives may include graphics and text that allow the user 122 to review the accident description 176 that the user 122 receives. The accident description 176 that the insurer 172 may be formatted for the computing device 174 to ingest the data into the insurer's computing system. This formatting may include providing the data in XML format or another format that labels each part of the accident description 176. In some implementations, the accident actions 146 may specify to transmit the accident description to other parties such as law enforcement or other first responders, a government agency such as a department of transportation, or any other similar recipient. In some instances, the user 122 may grant permission for the accident description 176 to be transmitted to another party. In some instances, the user 122 may revise the accident description 176 before transmitting to another party by removing some details or adding new details.

In response to the data collection request 148, the description generator 144 requests data identifying the computing devices that are in the vicinity of the accident. The description generator 144 provides location information of the accident to the mobility manager 138 and a threshold distance based on the accident classification 132. The mobility manager 138 determines that the camera 166 that is connected to the building 168 is located in the threshold distance of the accident location. The mobility manager 138 provides data identifying the camera 166 to the description generator 144. In stage E, the description generator 144 transmits a video request 162 to the camera 166. The video request 162 may specify a time period for the camera 166 to provide the video data 164. In response to the video request 162, the camera 166 may provide the video data 164 for the specified time period to the server 106. In the case where the camera 166 does not have access to video data for the specified time period, the camera 166 may transmit, to the server 106, data indicating that the camera 166 does not have access to video data for the specified time period.

In some implementations, the server 106 may store data that relates computing devices in various vehicles to users. Each of those users may have another computing device, such as a mobile phone. The data may relate the computing device 104, the user 122, and the computing device 124. Based on receiving the sensor data 116 and the vehicle data 118 from the computing device 104, the description generator 144 may identify the owner of the vehicle, which may be the user 122. The description generator 144 may identify the computing device 124 of the user 122. In some implementations, the server 106 may determine that the computing device 124 is located in the vicinity of the accident based on the data received from the mobility manager 138.

In some implementations, the computing device 124 may include a vehicle application 154 that communicates with the accident detector 126 of the server 106 using the communications interface 156. Based on this communication, the description generator 144 may determine that the computing device 124 is in the vicinity of the accident based on communications between the vehicle application 154 and the accident detector 126.

In stage F and in response to the data collection request 148, the description generator 144 may transmit an image request 160 to the computing device 124. The computing device may receive the image request 160 through the communications interface 156. The communications interface 156 may include communication components that enable the computing device 124 to transmit data and receive data from other devices. For example, the communications interface 156 may be able to receive and exchange data with the server 106. The communication interface 156 may include an interface that is configured to communicate with base stations of a wireless carrier network. In some implementations, the communication interface 156 may be configured to communicate over a wide area network, a local area network, the internet, a wired connection, a wireless connection, and/or any other type of network or connection. The wireless connections may include Wi-Fi, short-range radio, infrared, and/or any other wireless connection.

The vehicle application 154 of the computing device 124 may receive the image request 160 and generate a graphical interface based on the image 158. The graphical interface may prompt the user 122 to capture an image of the accident with the camera of the computing device 124. The user 122 may capture an image of the accident and the vehicle application 154, through the communications interface 156, may transmit the image 158 to the server 106. In some implementations, the user 122 may not capture the image 158 within a period of time. If the period of time elapses without the user 122 capturing the image 158, then vehicle application 154 may transmit an indication that an image was unable to be captured.

The description generator 144 may receive the video 164 and the image 158. The description generator 144 may incorporate the video 164 and the image 158 into the accident description 176 as specified by the accident actions 146. The description generator may generate an accident description 176 for the insurer 172 and an accident description 176 for the user 122. In stage G, the communications interface 142 may transmit the accident description 176 for the insurer 172 to the computing device 174 and transmit the accident description 176 for the user 122 to the computing device 124.

The accident actions 146 may specify that the accident description 176 for the insurer 172 includes the location of the accident, the speed of the vehicle, the tire pressure, the brake pedal movement, an identifier of the vehicle, and/or any images or video captured before, during, or after the accident, as received from various sensors in or on the vehicle and coupled to the on-board diagnostic port. The accident actions 146 may specify that the accident description 176 for the user 122 may include the location of the accident, any images or video captured before, during, or after the accident, and/or prompts that request or remind the user 122 to take additional actions. For example, the additional actions may include to request contact information from any other people who may have seen the accident, contact information for a property owner if the accident occurred on private property, and/or other reminders to collect additional information.

The additional actions for the user 122 may vary depending on the classification of the accident and/or other characteristics of the accident. For example, the additional actions may include a request to obtain insurance information for other drivers in the case of a multi-vehicle accident. If the accident was on private property, then the additional actions may include a recommendation to collect information of the property owner.

In some implementations, the accident description 176 for the user 122 may request permission before sending the accident description 176 to the insurer 172 or any other third party. In some implementations, the accident description 176 for the user 122 may include a request to identify any additional parties who should receive the accident description 176. This may include family and/or friends of the user 122, another party involved in the accident, and/or any other individuals. In response to receiving from the user 122 an identification of additional parties with which to share the accident description 176, the server 106 may transmit the accident description 176 to those additional parties.

Figure 2:
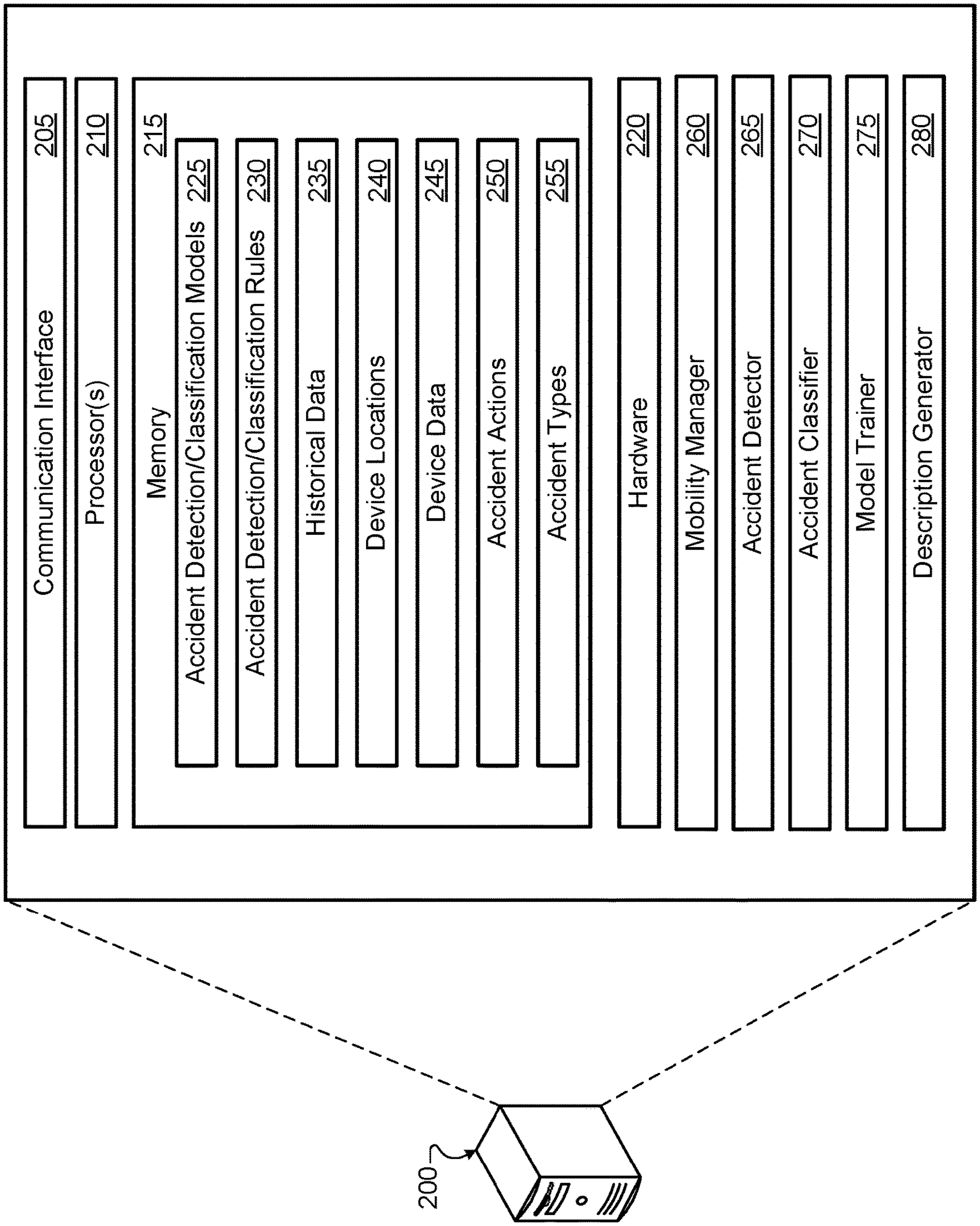
FIG. 2 illustrates an example server that is configured to detect, classify, and report an accident.

FIG. 2 illustrates an example server 200 that is configured to detect, classify, and report an accident. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 260. The mobility manager 260 may be similar to the mobility manager 138 of FIG. 1. The mobility manager 260 may be configured to monitor the location of a computing device that is connected to the server 200 through a wireless base station such as a gNodeB. The location of the computing device may include the location of the wireless base station to which the computing device is connected and/or GPS data received from the computing device. The mobility manager 260 may store the location data in the device locations 240 of the server 200.

In some implementations, the mobility manager 260 may determine the location of a computing device at periodic intervals, such as every five seconds. In some implementations, the mobility manager 260 may determine the location of a computing device when the computing device connects to a different wireless base station and/or provides updated GPS data. In some implementations, the mobility manager 260 may determine the location of the computing device relative to the base station with which the computing device is communicating. In this case, the mobility manager 260 may determine the relative location based on data collected from the base station such as signal strength and direction of communications between the computing device and the base station. The mobility manager 260 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement an accident detector 265. The accident detector 265 may be similar to the accident detector 126 of FIG. 1. The accident detector 265 may be configured to analyze the device data 245 received from computing devices that are located in vehicles and analyze the device locations 240. The computing devices may provide sensor data collected from sensors that are included in the computing devices and vehicle data that includes vehicle diagnostic data received from the vehicle. The server 200 receives the sensor data and the vehicle data through the communications interface 205 and stores the sensor data and the vehicle data in the device data 245. In some implementations, the data received from the computing devices may include an identifier of the vehicle and/or timestamp data.

Based on analyzing the device data 245, the accident detector 265 may be configured to determine when the vehicle was likely involved in an accident. The accident detector 265 may use the accident detection/classification models 225 and/or the accident detection/classification rules 230 to analyze the device data 245 and the device locations 240. The accident detection/classification rules 230 may specify how to compare the device data 245 and the device locations 240 to determine whether a vehicle was involved in an accident. The accident detection/classification rules 230 may be based on patterns that exist in the historical data 235. For example, an accident detection rule may indicate that a vehicle has likely been involved in an accident if the airbag has deployed and/or if the acceleration of the vehicle was greater than a threshold, such as twenty miles per hour per second. The accident detection/classification models 225 may be configured to receive the device data 245 and the device locations 240 and output data indicating whether a vehicle has likely been in an accident. The accident detection/classification models 225 may be trained using machine learning and historical data 235 that includes device data and device locations collected from vehicles before, during, and after accidents. In some implementations, the accident detection/classification models 225 may output an accident confidence score that indicates a likelihood that the vehicle was involved in an accident.

The one or more processors 210 may implement a model trainer 275. The model trainer 275 may be configured to generate the accident detection/classification models 225 using the historical data 235 and machine learning. The historical data 235 may include vehicle data, sensor data, and location data collected from various computing devices that are located in vehicles. The historical data 235 may also include data identifying whether the vehicle was involved in an accident. The model trainer 275 may generate multiple data samples that each include vehicle data, sensor data, location data, and data identifying whether the vehicle was involved in an accident. Each data sample may include data collected during a period of time. For example, the historical data 235 may include vehicle data, sensor data, and location data collected from a vehicle while the driver drove from home to work without an accident. The model trainer 275 may generate multiple data samples that each include vehicle data, sensor data, and location data collected over two minutes. The time periods of some data samples may overlap. Each of the data samples may include a no-accident label indicating that the vehicle was not involved in an accident. As another example, the historical data 235 may include vehicle data, sensor data, and location data collected from a vehicle while the driver drove from home and then an accident occurred. The model trainer 275 may generate multiple data samples that each include vehicle data, sensor data, and location data collected over two minutes. The time periods of some data samples may overlap. Each of the data samples that represent the time periods up to two minutes before the accident may include an accident label. Each of the data samples that represent the time periods outside of two minutes from the accident may include a no-accident label.

The model trainer 275 may train the accident detection/classification models 225 using the data samples and machine learning. The model trainer 275 may train multiple models that are each configured to receive different types of data, depending on the vehicle data, sensor data, and location data included in the data samples. For example, some models may be configured to receive tire pressure data and others may not be configured to receive tire pressure data. The accident detector 265 may select the appropriate model from the accident detection/classification models 225 based on the data included in the device data 245. In some implementations, the model trainer 275 may be implemented by one or more processors on another computing device. That computing device may provide the models to the server 200.

The one or more processors 210 may implement an accident classifier 270. The accident classifier 270 may be similar to the accident classifier 130 of FIG. 1. The accident classifier 270 may be configured to select an accident classification from the accident types 255. The accident classifier 270 may receive data from the accident detector 265 indicating that a vehicle is in an accident. The accident detector 265 may provide the device data that corresponds to the accident to the accident classifier 270. In some implementations, the accident detector 265 may identify the device data that corresponds to the accident using timestamps and/or a vehicle identifier. The accident classifier 270 may access the device data 245 and analyze the device data identified by the accident detector 265.

The accident classifier 270 may analyze the device data using the accident detection/classification models 225 and/or the accident detection/classification rules 230. The accident types 255 may identify various types of accidents. For example, the accident types 255 may include a low-speed single-vehicle accident, a low-speed multi-vehicle accident, a high-speed single-vehicle accident, a high-speed multi-vehicle accident, and/or any other similar accident types. The accident detection/classification rules 230 may include rules and/or definitions for identifying a type of accident and may specify how to compare the device data 245 to classify an accident using the accident types 255. For example, the rule for the low-speed single-vehicle accident may be that one vehicle strikes an object other than another vehicle at a speed of less than twenty miles per hour. The definition for the high-speed multi-vehicle accident may be that one vehicle strikes another vehicle at a speed of greater than twenty miles per hour. Other rules may be based on additional factors, such as whether the airbag deployed. The accident classifier 270 may generate the accident detection/classification rules 230 by identifying patterns in the historical data 235.

The accident detection/classification models 225 may be configured to receive the device data 245 and output data indicating a classification of the accident. The accident classifier 270 may select a model from the accident detection/classification models 225 and provide the portion of the device data 245 that corresponds to the accident detection as an input to the model. The accident detection/classification models 225 may output data indicating a classification of the accident.

The model trainer 275 may train the accident detection/classification models 225 that are configured to receive vehicle data, sensor data, and location data of a vehicle that was involved in an accident and output data classifying the accident. The model trainer 275 may train the accident detection/classification models 225 using machine learning and the historical data 235. The model trainer 275 may use the data samples that include an accident label and bypass using the data samples that include a no-accident label. The model trainer 275 may label the selected data samples with an accident type using the rules and/or definitions included in the accident types 255 and/or the accident detection/classification rules 230.

The model trainer 275 may train multiple models that are configured to receive different types of device data based on the data included in the data samples. If a group of data samples includes tire pressure data and another group of data samples does not include tire pressure data, then the model trainer 275 may train different models, one that is configured to receive tire pressure data and another that is configured to receive data other than tire pressure data. The accident classifier 270 may select the accident detection/classification model from the accident detection/classification models 225 based on the device data 245.

The one or more processors 210 may implement a description generator 280. The description generator 280 may be similar to the description generator 144 of FIG. 1. The description generator 280 may be configured to generate a description of an accident, determine recipients for the accident description, and/or determine whether to request any additional data that may be related to the accident. The description generator 280 may access the accident actions 250 that specify various actions for different types of accident. For example, in the case of a low-speed single- or multi-vehicle accident, the accident actions 250 may specify to request that a driver and/or passenger take pictures of the accident. As another example, in the case of a high-speed single or multi vehicle accident, the accident actions 250 may specify actions to ensure that a driver and/or passenger are safe. These actions may include requesting that the driver and/or passenger respond to a request sent to a computing device of the driver or passenger. Some additional actions may be to identify and alert local first responders and provide the first responders with the accident description.

In some implementations, an action included in the accident actions 250 may specify that the description generator 280 identify additional computing devices in a vicinity of the accident. The description generator 280 may request, from the mobility manager 138, data identify computing devices that are a threshold distance from the location of the accident. The accident actions 250 may specify a threshold distance based on the type of accident. For example, if the accident is a high-speed multi-vehicle accident, then the threshold distance may be one hundred meters from the location of accident and/or the vehicle. If the accident is a low-speed single-vehicle accident, then the threshold distance may be thirty meters from the location of accident and/or the vehicle.

The description generator 280 may receive data identifying the computing devices that are within a threshold distance of the accident. The description generator 280 may determine the type of these computing devices. Based on the type of the computing devices that are within a threshold distance of the accident, the description generator may request additional data from these devices. For example, if the nearby computing device is a camera, then the description generator 280 may request image and/or video data that was captured during, before, and/or after the accident. If the nearby computing device is a mobile phone, then the description generator 280 may transmit a request for image, video, and/or audio data of the vicinity of the accident. This may include a request to a user of the mobile phone to capture the image, video, and/or audio data. The description generator 280 may also request that the user of the mobile phone provide any information related to the accident, such as a description of any events related to the accident.

The model trainer 275 may generate the accident actions 250 based on analyzing previous requests for information related to accidents. For each of the previous accidents, the model trainer 275 may analyze the historical data 235 that includes the location of the accident, any injuries to any drivers, passengers, and/or other people, the speed of the vehicle, the data requested by other parties, the identity of the other parties, and/or any other similar sensor data or vehicle data. The model trainer 275 may determine the types of data that each party requests for each type of accident. For example, a first responder may request identifying information for the drivers of the vehicles in the case of a low-speed accident. After a high-speed accident, a first responder may request information for any passengers and/or witnesses of the accident in additional to any injuries of the drivers, passengers, and/or other people. An insurer may request insurance information for all parties involved in the accident.

Based on analyzing the previous requests for information related to accidents, the model trainer 275 may generate the accident actions 250 that specify the data to request and the recipients for information related to the accident. The accident actions 250 may specify how to format the data before providing the data to each recipient. A first responder may receive the data in a different format than an insurer. The accident actions 250 may specify what accident-related data to combine and how to combine and format the accident-related data for each recipient.

In some implementations, a recipient may receive an accident description from the server 200 and request additional data that may not be included in the accident description. In this case, the description generator 280 may receive the request and, if available, provide the additional information. The model trainer 275 may also update the accident actions 250 to ensure that the requested data be collected in the future when a similar accident occurs.

In some implementations, the device data 245 may include data that relates computing devices in various vehicles to users. Each of those users may have another computing device, such as a mobile phone. The data may relate a computing device in a vehicle, a user, a vehicle, and/or a mobile phone of the user. Based on receiving the sensor data and the vehicle data from a computing device in a vehicle, the description generator 280 may identify the owner of the vehicle. In some implementations, the description generator 280 may determine that a mobile phone of the owner is located in the vicinity of the accident based on the data received from the mobility manager 260.

The additional actions for the driver or passenger of the vehicle may vary depending on the classification of the accident and/or other characteristics of the accident. For example, the additional actions may include a request to obtain insurance information for other drivers in the case of a multi-vehicle accident. If the accident was on private property, then the additional actions may include a recommendation to collect information of the property owner.

In some implementations, the accident description provided to a driver or passenger may request permission before sending the accident description to another party. In some implementations, the accident description provided to the driver or passenger may include a request to identify any additional parties who should receive the accident description. This may include family and/or friends of the recipient, another party involved in the accident, and/or any other individuals. In response to receiving a request from the recipient for an identification of additional parties with which to share the accident description, the description generator 280 may transmit the accident description to those additional parties.

Figure 3:
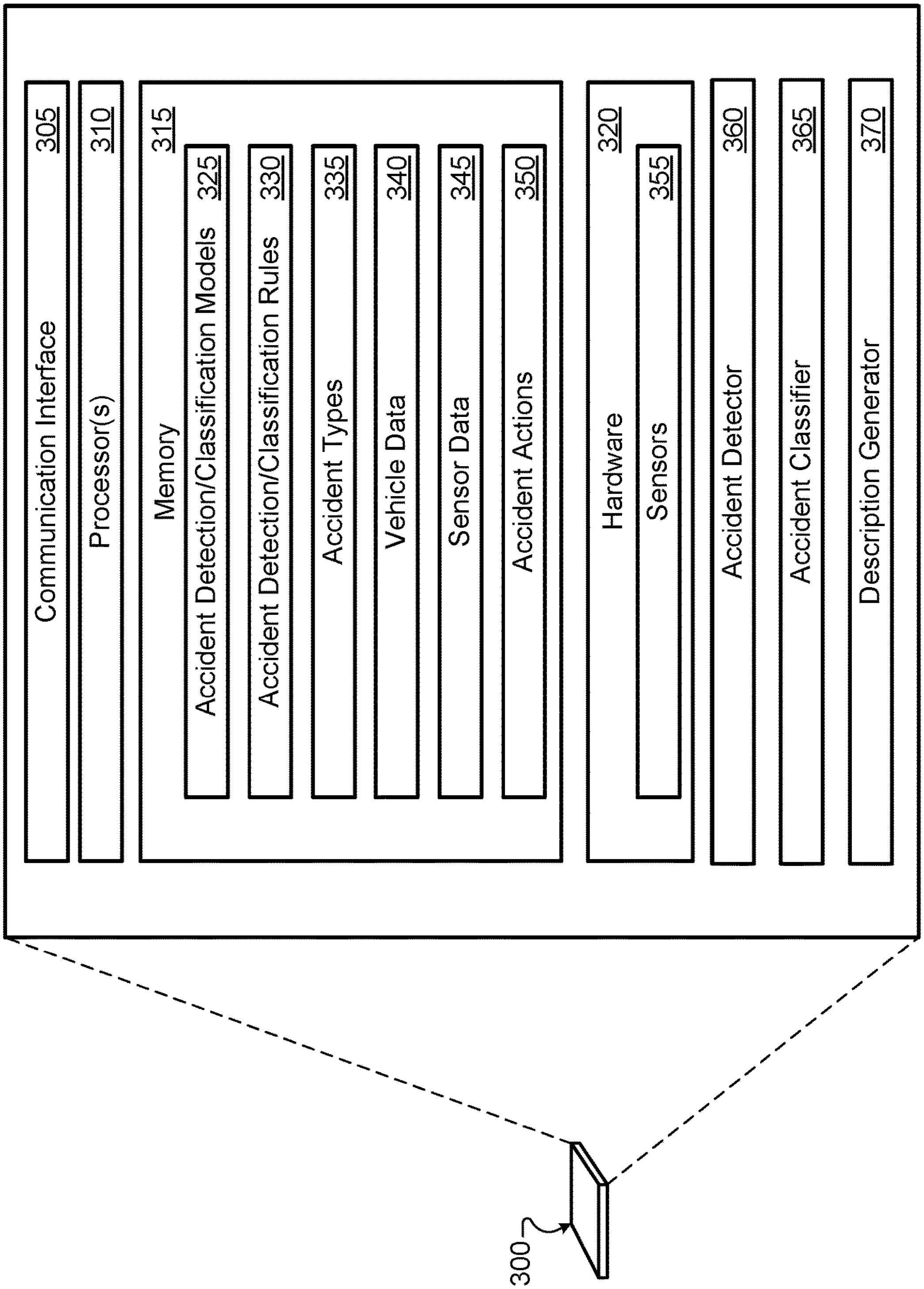
FIG. 3 illustrates an example computing device that is configured to communicate with a vehicle and detect, classify, and report an accident.

FIG. 3 illustrates an example computing device 300 that is configured to communicate with a vehicle and detect, classify, and report an accident. The computing device 300 may be any type of computing device that is configured to communicate with other computing devices. The computing device 300 may interact with a wireless carrier network. The computing device 300 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The computing device 300 may be similar to computing device 104 of FIG. 1. Some of the components of the computing device 300 may be implemented in a single computing device or distributed over multiple computing devices. Some of the components may be in the form of virtual machines or software containers that are hosted in a cloud in communication with disaggregated storage devices. In some implementations, the computing device 300 may be integrated into a vehicle or communicate with a vehicle through an on-board diagnostic port.

The computing device 300 may include a communication interface 305, one or more processors 310, memory 315, and hardware 320. The communication interface 305 may include communication components that enable the computing device 300 to transmit data and receive data from devices connected to the wireless carrier network. The communication interface 305 may include an interface that is configured to communicate with base stations of a wireless carrier network. The communication interface 305 may transmit data to the base stations for transmission to the other devices. In some implementations, the communication interface 305 may be configured to communicate using over a wide area network, a local area network, the internet, a wired connection, a wireless connection, and/or any other type of network or connection. The wireless connections may include Wi-Fi, short-range radio, infrared, and/or any other wireless connection. In some implementations, the communication interface 305 may include a connector that is configured to couple to an on-board diagnostic port of a vehicle.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The hardware 320 may also include various sensors 355 that are configured to detect the movement of the computing device 300, the location of the computing device 300, and/or the environment around the computing device 300. For example, the sensors 355 may include an accelerometer, a gyroscope, a GPS receiver, a barometer, an ambient light sensor, a camera, a compass, a gravity sensor, a proximity sensor, a magnetometer, a microphone and/or any other similar sensors.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory may store sensor data 345 that is generated by the various sensors 355 and vehicle data 340 that includes data received from the vehicle through the communication interface 305. The vehicle data 340 may include diagnostic data such as real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The sensor data 345 and the vehicle data 340 may be collected and/or stored while the vehicle is on, moving, and/or in response to a request to collect and store data. The sensor data 345 and the vehicle data 340 may store data for a previous time period, such as the previous thirty minutes. As the sensors 355 generate additional sensor data and/or the communication interface 305 receive additional vehicle data, the sensor data 345 and the vehicle data 340 may overwrite the oldest data. The sensor data 345 and the vehicle data 340 may include timestamps. In some implementations, the memory 315 may store a vehicle identifier that identifies a vehicle to which the computing device 300 is communicating. In some implementations, the memory 315 may store data identifying an owner of the vehicle and/or identifiers for a mobile device of the owner of the vehicle.

The one or more processors 310 may implement an accident detector 360. The accident detector 360 may be similar to the accident detector 126 of FIG. 1 and/or the accident detector 265 of FIG. 2. The accident detector 360 may be configured to analyze the sensor data 345 and the vehicle data 340 and determine whether the vehicle with which the computing device 300 is communicating has been in an accident. The accident detector 360 may use the accident detection/classification models 325 and/or the accident detection/classification rules 330 to analyze the sensor data 345 and the vehicle data 340. The accident detection/classification rules 330 may specify how to compare the sensor data 345 and the vehicle data 340 to determine whether the vehicle was involved in an accident. The accident detection/classification rules 330 may be based on patterns that exist in historical data. The computing device 300 may receive the accident detection/classification rules 330 and/or the accident detection/classification models 325 from a server. As an example, an accident detection rule may indicate that a vehicle has likely been involved in an accident if the airbag has deployed and/or if the acceleration of the vehicle was greater than a threshold, such as twenty miles per hour per second. The accident detection/classification models 325 may be configured to receive the sensor data 345 and the vehicle data 340 and output data indicating whether the vehicle has likely been in an accident. The accident detection/classification models 325 may be trained using machine learning and historical data that includes sensor data and vehicle data collected from vehicles before, during, and after accidents. In some implementations, the accident detection/classification models 325 may output an accident confidence score that indicates a likelihood that the vehicle was involved in an accident.

The one or more processors 310 may implement an accident classifier 365. The accident classifier 365 may be similar to the accident classifier 130 of FIG. 1 and/or the accident classifier 270 of FIG. 2. The accident classifier 365 may be configured to select an accident classification from the accident types 335. The accident classifier 365 may receive data from the accident detector 360 indicating that a vehicle is in an accident. The accident detector 360 may provide the vehicle data and sensor data that corresponds to the accident to the accident classifier 365. In some implementations, the accident detector 360 may identify the vehicle data and sensor data that corresponds to the accident using timestamps and/or a vehicle identifier. The accident classifier 365 may access the sensor data 345 and the vehicle data 340 and analyze the sensor data and the vehicle data identified by the accident detector 360.

The accident classifier 365 may analyze the sensor data 345 and the vehicle data 340 using the accident detection/classification models 325 and/or the accident detection/classification rules 330. The accident types 335 may identify various types of accidents. For example, the accident types 335 may include a low-speed single-vehicle accident, a low-speed multi-vehicle accident, a high-speed single-vehicle accident, a high-speed multi-vehicle accident, and/or any other similar accident types. The accident detection/classification rules 330 may include rules and/or definitions for identifying a type of accident and may specify how to compare the sensor data 345 and the vehicle data 340 to classify an accident using the accident types 335. For example, the rule for the low-speed single-vehicle accident may be that one vehicle strikes an object other than another vehicle at a speed of less than twenty miles per hour. The definition for the high-speed multi-vehicle accident may be that one vehicle strikes another vehicle at a speed of greater than twenty miles per hour. Other rules may be based on additional factors, such as whether the airbag deployed.

The accident detection/classification models 325 may be configured to receive the sensor data 345 and the vehicle data 340 and output data indicating a classification of the accident. The accident classifier 365 may select a model from the accident detection/classification models 325 and provide the portion of the sensor data 345 and the vehicle data 340 that corresponds to the accident detection as an input to the model. The accident detection/classification models 325 may output data indicating a classification of the accident.

The one or more processors 310 may implement a description generator 370. The description generator 370 may be similar to the description generator 144 of FIG. 1 and/or the description generator 280 of FIG. 2. The description generator 370 may be configured to generate a description of an accident, determine recipients for the accident description, and/or determine whether to request any additional data that may be related to the accident. The description generator 370 may access the accident actions 350 that specify various actions for different types of accident. For example, in the case of a low-speed single or multi vehicle accident, the accident actions 350 may specify to request that a driver and/or passenger take pictures of the accident. As another example, in the case of a high-speed single or multi vehicle accident, the accident actions 350 may specify actions to ensure that a driver and/or passenger are safe. These actions may include requesting that the driver and/or passenger respond to a request sent to a computing device of the driver or passenger. Some additional actions may be to identify and alert local first responders and provide the first responders with the accident description. The computing device 300 may receive the accident actions from a server.

In some implementations, an action included in the accident actions 350 may specify that the description generator 370 identify additional computing devices in a vicinity of the accident. The description generator 370 may request, from a server, data identifying computing devices that are a threshold distance from the location of the accident. The accident actions 350 may specify a threshold distance based on the type of accident. For example, if the accident is a high-speed multi-vehicle accident, then the threshold distance may be one hundred meters from the location of accident and/or the vehicle. If the accident is a low-speed single-vehicle accident, then the threshold distance may be thirty meters from the location of accident and/or the vehicle. In some implementations, the description generator 370 may request that the communication interface 305 detect nearby computing devices. The communication interface 305 may detect nearby computing devices using short-range radio, infrared communications, and/or any other communication technique.

The description generator 370 may receive, from a server or the communication interface 305, data identifying the computing devices that are within a threshold distance of the accident. The description generator 370 may determine the type of these computing devices. Based on the type of the computing devices that are within a threshold distance of the accident, the description generator 370 may request additional data from these devices. For example, if the nearby computing device is a camera, then the description generator 370 may request image and/or video data that was captured during, before, and/or after the accident. If the nearby computing device is a mobile phone, then the description generator 370 may transmit a request for image, video, and/or audio data of the vicinity of the accident. This may include a request to a user of the mobile phone to capture the image, video, and/or audio data. The description generator 370 may also request that the user of the mobile phone provide any information related to the accident, such as a description of any events related to the accident. The description generator 370 may request that the communication interface 305 transmit the request to the server or directly to the computing device.

In some implementations, a recipient may receive an accident description from the computing device 300 and request additional data that may not be included in the accident description. In this case, the description generator 370 may receive the request and, if available, provide the additional information. The description generator 370 may provide this request to the server for the purpose of the server updating the accident actions 350.

In some implementations, the vehicle data 340 may include data that relates the computing device 300 to a vehicle, a user, and/or a mobile phone of the user. The description generator 370 may request that the communication interface 305 attempt to communicate with a mobile phone of the user. If the communication interface 305 is able to communicate with the mobile phone of the user, then the description generator 370 may request that the user perform an action based on the accident actions 350.

The additional actions for the driver or passenger of the vehicle may vary depending on the classification of the accident and/or other characteristics of the accident. For example, the additional actions may include a request to obtain insurance information for other drivers in the case of a multi-vehicle accident. If the accident was on private property, then the additional actions may include a recommendation to collect information of the property owner.

In some implementations, the accident description provided to a driver or passenger may request permission before sending the accident description to another party. In some implementations, the accident description provided to the driver or passenger may include a request to identify any additional parties who should receive the accident description. This may include family and/or friends of the recipient, another party involved in the accident, and/or any other individuals. In response to receiving a request from the recipient an identification of additional parties with which to share the accident description, the description generator 370 may transmit the accident description to those users through the server or directly to the computing devices of those additional parties.

Figure 4:
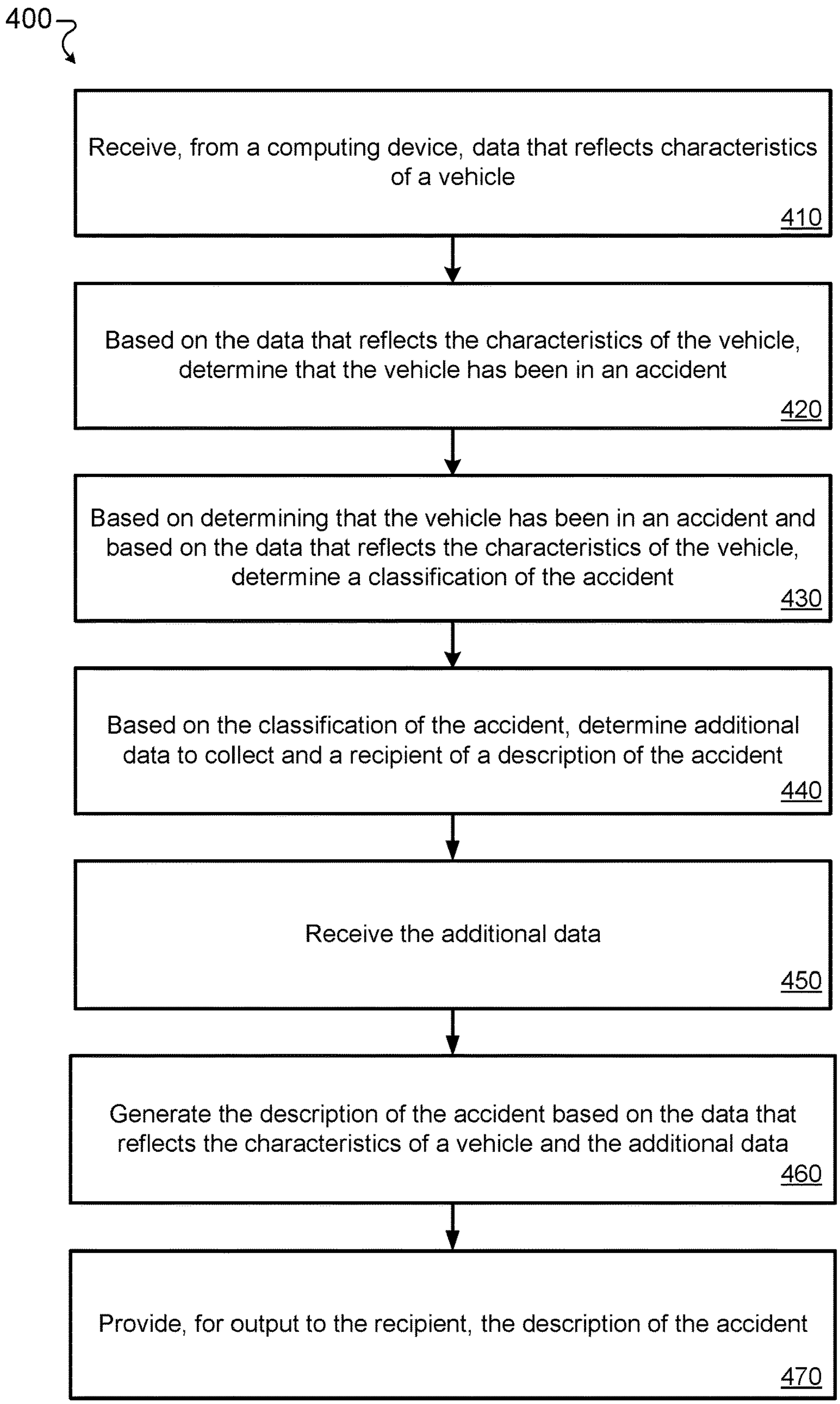
FIGS. 4 and 5 are flowcharts of example processes for detecting, classifying, and reporting an accident.

FIG. 4 is a flowchart of example process 400 for detecting, classifying, and reporting an accident. In general, the process 400 receives data from a computing device located in a vehicle. Based on that data, the process 400 determines that the vehicle has likely been in an accident. Based on determining that the vehicle has likely been in an accident and based on the data from the computing device, the process 400 generates a description of the accident and requests additional data as needed for the description. The process 400 will be described as being performed by the server 106 of FIG. 1 and will include references to other components in FIG. 1. The process 400 may also be performed by the server 200 of FIG. 2 and/or the computing device 300 of FIG. 3.

The server 106 receives, from a computing device 104, data that reflects characteristics of a vehicle 102 (410). The computing device 104 may be connected to an on-board diagnostic port of the vehicle. The data that reflects characteristics of a vehicle 102 may include speed data, location data, braking data, engine temperature data, tire pressure data, engine speed data, accelerometer data, gyroscope data, magnetometer data, and gravity sensor data. Some of this data may be received from the vehicle through the on-board diagnostic port, and some may be generated by sensors 110 that are included in the computing device 104.

Based on the data that reflects the characteristics of the vehicle 102, the server 106 determines that the vehicle 102 has been in an accident (420). The server 106 may analyze the data that reflects characteristics of the vehicle 102 using various rules and/or models that are configured to determine whether a vehicle has been in an accident. For example, the server 106 may select a model based on the data included in the data that reflects the characteristics of the vehicle 102. The server 106 may provide the data that reflects the characteristics of the vehicle 102 to the model as an input. The model may output data indicating whether the vehicle 102 was likely in an accident.

Based on determining that the vehicle 102 has been in an accident and based on the data that reflects the characteristics of the vehicle 102, the server 106 determines a classification of the accident (430). The server 106 analyzes the data that reflects the characteristics of the vehicle 102 using various rules and/or models that are configured to classify an accident. For example, the server 106 may provide the data that reflects the characteristics of the vehicle 102 to a model as an input. The model may output data indicating the type of accident in which the vehicle 102 was involved. As another example, the server 106 may compare the data that reflects the characteristics of the vehicle 102 as specified by various rules to determine how to classify the accident.

In some implementations, the driver and/or passenger in the vehicle may have a computing device, such as a mobile phone 124, in the vehicle 102 during the accident. The mobile phone 124 may include a vehicle application that allows the mobile phone 124 to provide sensor data to the server 106. This sensor data may be generated by the sensors included in the mobile phone 124. The mobile phone 124 may provide the sensor data to the server 106 in response to a request from the server 106, which may occur in response to the server 106 detecting an accident. The mobile phone 124 may provide the sensor data to the server 106 at periodic intervals such as every two minutes. The server 106 may also use the sensor data from the mobile phone 124 to determine whether the vehicle 102 was involved in an accident and/or to classify the accident.

Based on the classification of the accident, the server 106 determines additional data to collect and a recipient of a description of the accident (440). The server 106 may identify a device that has access to the additional data and output, to that device, a request for the additional data. For example, the server 106 may classify the accident as a high-speed accident. Based on that classification, the server 106 may request data related to the safety and well-being of the driver and/or passengers in the vehicle 102. The data related to the safety and well-being of the driver and/or passengers may include whether the driver and/or passengers can speak, respond to requests sent to their mobile devices, video collected from any devices inside the vehicle 102, and/or any other similar information. Also based on that classification, the server 106 may determine that a recipient of the accident description should be a first responder. As another example, the server 106 may classify the accident as a low-speed accident. Based on that classification, the server 106 may request image data captured by devices in the vicinity of the vehicle 102. The data may include image data captured by a camera 166 and/or any other similar information. Also based on that classification, the server 106 may determine that a recipient of the accident description should be the insurer 172 of the vehicle 102.

The server 106 receives the additional data (450). The server 106 may identify the computing device that has access to the additional data. The server 106 may identify the computing devices in a vicinity of the vehicle. The computing devices in the vicinity of the vehicle may include mobile devices of the drivers, any passengers, and nearby individuals, any stationary cameras, and/or any other similar devices. The server 106 may request the additional data from any of those nearby devices that may have access to the additional data. For example, the server 106 may request image data from the mobile devices and the cameras. The server 106 may request narrative information from the mobile devices.

The server 106 generates the description of the accident based on the data that reflects the characteristics of a vehicle and the additional data (460). The server 106 may format the description differently depending on the recipient. For example, if the recipient is an insurer, then the server 106 may format the description to be compatible with the systems of the insurer. If the recipient is the driver of the vehicle 102, then the server 106 may format the description to be compatible with the computing device 124 of the user. In some implementations, the description provided to the user may include recommendations and/or suggestions about actions to perform after the accident. The actions may include taking pictures of the vehicles involved in the accident, exchanging insurance information with other parties, and/or any other similar action.

The server 106 provides, for output to the recipient, the description of the accident (470). In some implementations, the recipient may receive the description and request additional data. The server 106 may receive the request and attempt to access the additional data. If the server 106 is able to access the additional data, then the server 106 may provide the additional data. The server 106 may also update the data requested by the recipient so that future descriptions may include the additional data.

Figure 5:
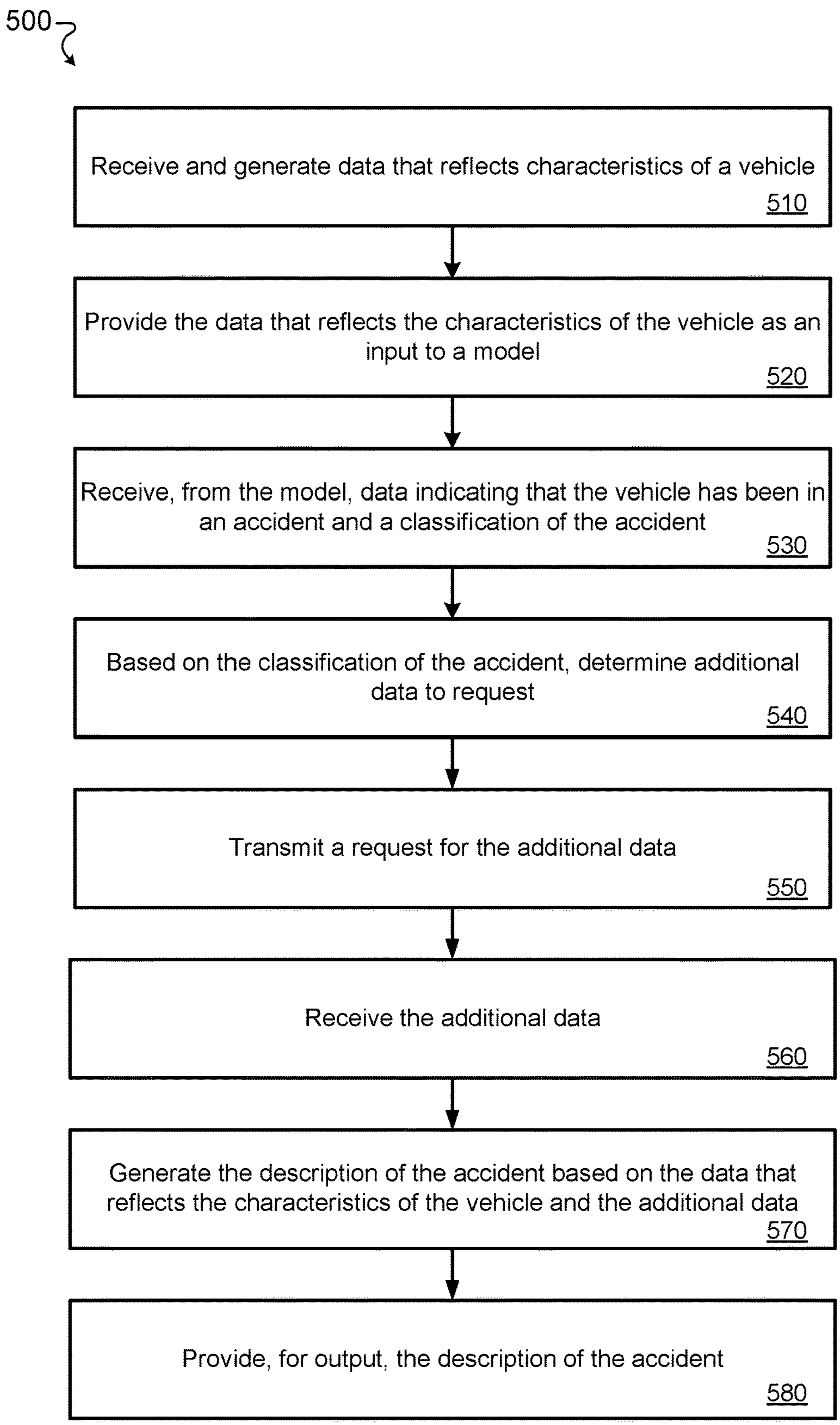

FIG. 5 is a flowchart of example process 500 for detecting, classifying, and reporting an accident. In general, the process 500 receives data from a computing device located in a vehicle. Based on that data, the process 500 determines that the vehicle has likely been in an accident. Based on determining that the vehicle has likely been in an accident and based on the data from the computing device, the process 500 generates a description of the accident and requests additional data as needed for the description. The process 500 will be described as being performed by the computing device 300 of FIG. 3 and will include references to other components in FIGS. 1 and 3. The process 500 may also be performed by the computing device 104 of FIG. 1 an/or the server 200 of FIG. 2.

The computing device 300 receives and generates data that reflects characteristics of a vehicle (510). The computing device 300 may include sensors 355 that include accelerometer, a gyroscope, a GPS receiver, a barometer, an ambient light sensor, a camera, a compass, a gravity sensor, a proximity sensor, a magnetometer, a microphone and/or any other similar sensors. The sensors generate sensor data 345. The computing device 300 may also communicate with the vehicle through a communication interface 305 that may include a connector that interfaces with an on-board diagnostic port of the vehicle. The computing device 300 may receive vehicle diagnostic data such as real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The computing device 300 may store the vehicle data 340.

The computing device 300 provides the data that reflects the characteristics of the vehicle as an input to a model (520). The computing device 300 may analyze the data that reflects the characteristics of the vehicle using one or more accident detection/classification models and/or accident detection/classification rules. The accident detection/classification rules may specify how to compare the data that reflects the characteristics of the vehicle to determine whether the vehicle was involved in an accident and a classification of the accident. The accident detection/classification model may be configured to receive the data that reflects the characteristics of the vehicle and output data indicating whether the vehicle was likely involved in an accident and a classification of that accident.

The computing device 300 receives, from the model, data indicating that the vehicle has been in an accident and a classification of the accident (530). The accident detection/classification models may be trained using machine learning and historical data. The data samples used to train the accident detection/classification models may include vehicle data, sensor data, and a label indicating a type of accident if one occurred. For example, a data sample may include vehicle data, sensor data, and a label indicating no accident. Another data sample may include vehicle data, sensor data, and label indicating a single-vehicle high speed accident. In some implementations, the computing device 300 may provide the data that reflects the characteristics of the vehicle to a server. The server may provide the data that reflects the characteristics of the vehicle to the model and provide the output of the model to the computing device 300.

Based on the classification of the accident, the computing device 300 determines additional data to request (540). The computing device 300 may identify a device that has access to the additional data and output, to that device, a request for the additional data. For example, the computing device 300 may classify the accident as a high-speed accident. Based on that classification, the computing device 300 may request data related to the safety and well-being of the driver and/or passengers in the vehicle 102. The data related to the safety and well-being of the driver and/or passengers may include whether the driver and/or passengers can speak, respond to requests sent to their mobile devices, video collected from any devices inside the vehicle 102, and/or any other similar information. Also based on that classification, the computing device 300 may determine that a recipient of the accident description should be a first responder. As another example, the computing device 300 may classify the accident as a low-speed accident. Based on that classification, the computing device 300 may request image data captured by devices in the vicinity of the vehicle 102. The data may include image data captured by a camera 166 and/or any other similar information. Also based on that classification, the computing device 300 may determine that a recipient of the accident description should be the insurer 172 of the vehicle 102.

The computing device 300 transmits a request for the additional data (550). The computing device 300 may communicate directly with the identified device through the communication interface 305 or through the server 106. The additional data may include image data, audio data, video data, reaction data, narrative data, and/or any other similar data. Reaction data may include requesting that a user respond to a prompt on a mobile device. The prompt may request that the user speak or select an option on a screen of the mobile device. Narrative data may include requesting that a user respond with a description of what the user saw related to the accident.

The computing device 300 receives the additional data (560). In instances where the identified device does not have access to the additional data, the identified device may provide an indication of that to the computing device. The computing device 300 generates the description of the accident based on the data that reflects the characteristics of the vehicle and the additional data (570). The computing device 300 may format the description differently depending on the recipient. For example, if the recipient is an insurer, then the computing device 300 may format the description to be compatible with the systems of the insurer. If the recipient is the driver of the vehicle 102, then the computing device 300 may format the description to be compatible with the computing device 124 of the user. In some implementations, the description provided to the user may include recommendations and/or suggestions about actions to perform after the accident. The actions may include taking pictures of the vehicles involved in the accident, exchanging insurance information with other parties, and/or any other similar action.

The computing device 300 provides, for output, the description of the accident (580). In some implementations, the recipient may receive the description and request additional data. The computing device 300 may receive the request and attempt to access the additional data. If the computing device 300 is able to access the additional data, then the computing device 300 may provide the additional data. The computing device 300 may also update the data requested by the recipient so that future descriptions may include the additional data. The computing device 300 may provide that update to the server 106.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method, comprising:

generating, by a vehicle, data that reflects characteristics of the vehicle;

providing, by the vehicle, the data that reflects the characteristics of the vehicle as an input to a model;

receiving, from the model, data indicating that the vehicle has been in an accident and a classification of the accident;

based on the classification of the accident, accessing, by the vehicle, additional data;

based on the classification of the accident, determining, by the vehicle, a recipient of the description of the accident;

generating, by the vehicle, a description of the accident based on the data that reflects the characteristics of the vehicle and the additional data; and providing, for output by the vehicle and to the recipient, the description of the accident, wherein the description of the accident is presented on a display of a recipient device of the recipient.

2. The method of claim 1, wherein the data that reflects the characteristics of the vehicle comprises:

speed data, location data, braking data, engine temperature data, tire pressure data, engine speed data, accelerometer data, gyroscope data, magnetometer data, and gravity sensor data.

3. The method of claim 1, wherein:

the classification of the accident comprises a high-speed accident, the additional data comprises data related to a safety and wellbeing of passengers in the vehicle, and a recipient of the description of the accident comprises a first responder.

4. The method of claim 1, wherein:

the classification of the accident comprises a low-speed accident, the additional data comprises image data captured by a computing device in a vicinity of the vehicle, and a recipient of the description of the accident comprises a driver of the vehicle.

5. The method of claim 4, wherein the computing device in the vicinity of the vehicle is a mobile phone of the driver of the vehicle.

6. The method of claim 1, comprising:

receiving, from a mobile device of a passenger of the vehicle, mobile device data; and providing, by the vehicle, the mobile device data as an additional input to the model.

7. A vehicle, comprising:

one or more processors; and memory including a plurality of computer-executable components that are executable by the one or more processors to perform a plurality of actions, the plurality of acts comprising:

generating data that reflects characteristics of the vehicle;

receiving, from a mobile device of a passenger of the vehicle, mobile device data;

providing the data that reflects the characteristics of the vehicle and the mobile device data as an input to a model;

receiving, from the model, data indicating that the vehicle has been in an accident and a classification of the accident;

based on the classification of the accident, accessing additional data;

generating a description of the accident based on the data that reflects the characteristics of the vehicle and the additional data; and providing, for output to a recipient device, the description of the accident, wherein the description of the accident is presented on a display of the recipient device.

8. The vehicle of claim 7, wherein the data that reflects the characteristics of the vehicle comprises:

speed data, location data, braking data, engine temperature data, tire pressure data, engine speed data, accelerometer data, gyroscope data, magnetometer data, and gravity sensor data.

9. The vehicle of claim 7, wherein the plurality of acts comprise:

based on the classification of the accident, determining a recipient of the description of the accident, wherein providing, for output, the description of the accident comprises providing, for output to the recipient, the description of the accident.

10. The vehicle of claim 7, wherein:

the classification of the accident comprises a high-speed accident, the additional data comprises data related to a safety and wellbeing of passengers in the vehicle, and a recipient of the description of the accident comprises a first responder.

11. The vehicle of claim 7, wherein the plurality of acts comprise:

the classification of the accident comprises a low-speed accident, the additional data comprises image data captured by a computing device in a vicinity of the vehicle, and a recipient of the description of the accident comprises a driver of the vehicle.

12. The vehicle of claim 11, wherein the computing device in the vicinity of the vehicle is a mobile phone of the driver of the vehicle.

13. One or more non-transitory computer-readable media storing computer-executable instructions that upon execution cause one or more computers to perform acts comprising:

generating, by a vehicle, data that reflects characteristics of the vehicle;

providing, by the vehicle, the data that reflects the characteristics of the vehicle as an input to a model;

receiving, from the model, data indicating that the vehicle has been in an accident and a classification of the accident as a high-speed accident or a low-speed accident;

based on the classification of the accident as the high-speed accident or a low-speed accident, accessing, by the vehicle, additional data that comprises data related to a safety and wellbeing of passengers in the vehicle or that comprises image data captured by a computing device in a vicinity of the vehicle;

generating, by the vehicle, a description of the accident based on the data that reflects the characteristics of the vehicle and the additional data; and providing, for output by the vehicle and to (i) a first responder or (ii) a driver of the vehicle, the description of the accident, wherein the description of the accident is presented on a display of a first responder device of the first responder or a driver device of the driver.

14. The media of claim 13, wherein the data that reflects the characteristics of the vehicle comprises:

speed data, location data, braking data, engine temperature data, tire pressure data, engine speed data, accelerometer data, gyroscope data, magnetometer data, and gravity sensor data.

15. The media of claim 13, wherein the acts comprise:

based on the classification of the accident, determining, by the vehicle, a recipient of the description of the accident, wherein providing, for output, the description of the accident comprises providing, for output to the recipient, the description of the accident.

16. The media of claim 13, wherein the acts comprise:

receiving, from a mobile device of a passenger of the vehicle, mobile device data; and providing, by the vehicle, the mobile device data as an additional input to the model.

17. The media of claim 13, wherein the computing device in the vicinity of the vehicle is a mobile phone of the driver of the vehicle.

* * * * *